UNITED STATES PATENT OFFICE.

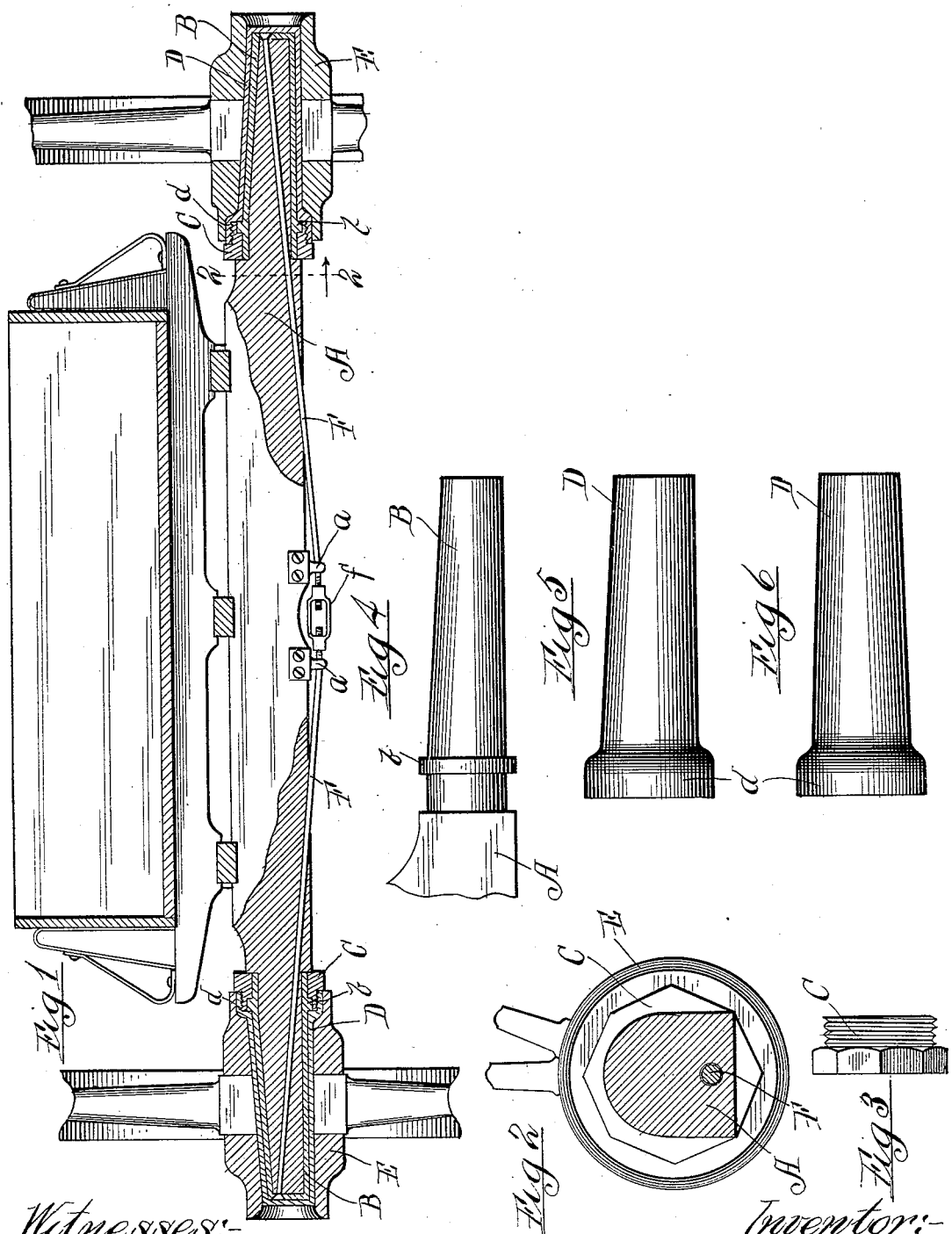

ALEXANDER CUNNINGHAM, OF CHICAGO, ILLINOIS.

VEHICLE-AXLE.

SPECIFICATION forming part of Letters Patent No. 646,571, dated April 3, 1900.

Application filed January 14, 1899. Serial No. 702,149. (No model.)

*To all whom it may concern:*

Be it known that I, ALEXANDER CUNNINGHAM, of Chicago, in the county of Cook and State of Illinois, have invented certain new and useful Improvements in Wheel-Boxes for Vehicles; and I do hereby declare that the following is a full, clear, and exact description thereof, reference being had to the accompanying drawings, and to the letters of reference marked thereon, which form a part of this specification.

This invention relates to an improvement in wheel-boxes for vehicles of that kind embracing a closed box adapted to retain the oil and upon which the hub is secured and means attached to the inner end of the hub whereby the same is held securely upon the axle.

The invention consists of the matters hereinafter more fully set forth, and defined in the appended claim.

In the drawings, Figure 1 illustrates the axle of a wagon provided with a device embodying my invention. Fig. 2 is a cross-section on line 2 2 of Fig. 1. Fig. 3 illustrates a nut adapted to engage the inner end of the hub-box. Fig. 4 is a side elevation of a skein made in accordance with my invention. Fig. 5 is a side view of the box which fits over the said skein. Fig. 6 is a plan view of the device illustrated in Fig. 5.

In the drawings, A represents a wooden axle as used in vehicles, upon the tapered ends of which are secured the skeins B B, provided at points near the inner ends of each with raised integral collars or bands $b\ b$.

D D indicate the hub-boxes, having internal dimensions complemental to the dimensions and form of the skeins B B and provided at their inner ends with the enlargements $d\ d$, forming internal shoulders for contact with the collars $b\ b$. The said enlarged parts on the inner ends of said boxes are internally screw-threaded and when in place upon the skeins project over the collars $b\ b$, leaving a space between the said screw-threads and the collar. C C indicate nuts externally screw-threaded and apertured to fit over the inner ends of the said skeins and provided also with an interior bearing-shoulder adapted for contact with the collars $b\ b$. The screw-threads on each of the said nuts are complemental to the screw-threads on the corresponding boxes D D. The boxes D D are secured rigidly in the hubs E E in a familiar manner. For the purpose of securely holding the said skeins from working off the axles and the better to strengthen the axle longitudinal truss-rods F F are secured in the outer end of said skeins and pass through the axles diagonally from the opposite ends toward the center thereof. The direction of the said truss-rods is downwardly toward the center in such manner that the inner screw-threaded extremities of the said rods will approach each other at a point somewhat below the center of the axle. $f$ indicates a turnbuckle of the usual construction, by means of which said rods may be placed under tension and the length of the rods adjusted.

The wooden axle A may be of any desired form or construction and adapted to be used upon any vehicle. The skeins B have closed integral outer ends. Said skeins are conical in form for the greater part of their length. The collar $b$ is shown as having the form of an integral raised flange on the skein, having bearing-faces on its inner and outer faces adapted for contact with the nut C and box D. The portions of the said skeins inside of the collars $b\ b$ and to which the nuts are applied are cylindric and fit closely within the nuts. The closed ends of the said skeins are provided with apertures near the upper side thereof to receive the ends of the truss-rods. The said apertures are enlarged at the outer faces of the end walls of the skeins and adapted to receive the conical ends of said truss-rods in such manner that when the same are inserted in place the outer parts thereof shall be flush with or countersunk into the outer surface of the said end wall of the skein.

Obviously the screw-thread may be on either the inner or outer side of the enlarged portion of the box. It is preferred, however, that the screw-threaded portion be internal the more effectually to prevent access of dirt to the parts. The nuts C act to draw the said boxes closely in contact with the said collars $b$ and the outer end of said sleeve into close contact with the outer end of the said skein. The apertured portion of the said nut is preferably of such length as to correspond with the cylindrical portion of the skein, so that when the nut is in its position upon the skein and the internal shoulder of the said nut is in bearing against the collar of the skein the head of the said nut will be in close proximity to the wood of the axle, thereby preventing foreign bodies finding their way into the joint between the nut and sleeve. The truss-rods F F are inserted in the aperture in the end of the skein heretofore described and through passages bored in the axle on lines extending diagonally downward across the central axis of the said axle and are of such length that the inner ends thereof, which are oppositely screw-threaded, as herein shown, shall nearly meet, as heretofore described. It is preferable that apertured brackets a a be secured upon the under side of the axle near the inner ends of the truss-rods to steady the said rods and form posts or studs by which the upward pressure of the truss-rods is transmitted to the axle. Said brackets also prevent the rods from being knocked out of position by coming in contact with any obstruction.

It is obvious that the device herein shown may be constructed very cheaply and possesses many advantages not found in axle-bearings heretofore constructed, among which may be mentioned the fact that the wheel-hub cannot in any manner be affected injuriously by the grease or oil used between the skein and sleeve, inasmuch as it is closely confined by the boxes thus made. The wheel also will run much longer without reoiling than in other devices. Moreover, the device presents a much more cleanly appearance, inasmuch as the outer end of the hub cannot at any time accumulate the dirt and grease, as common in the use of other devices. Moreover, so far as the skeins having closed outer ends and the truss-rods engaged with the end walls thereof are concerned this construction has the advantage of affording a strong, rigid, and unyielding connection of the ends of the truss-rods with the ends of the axle, while at the same time affording a means of securing the skeins firmly upon the axle without possibility of the same coming off or becoming loosened. Inasmuch as the heads of the truss-rods are countersunk into the said end wall of the skein the integral end of the hub-box is run in close contact therewith, which permits a much shorter hub being used than has heretofore been possible.

I claim as my invention—

The combination with a wooden axle, of axle-skeins fitting over the ends of the wooden axle and provided at their outer ends with a close end wall and having collars at their inner ends, truss-rods extending obliquely through the axle-arms of the wooden axle and connected with each other beneath the central part of the axle by a turnbuckle or like means, the outer ends of said truss-rods being attached to the upper parts of the end walls of the skeins by means of countersunk heads, and hub-boxes having integral end walls at their outer ends which fit against the integral end walls of the skeins, said hub-boxes being provided at ther inner ends with shoulders adapted to bear against the collars on the skeins and with screw-threads, and nuts engaging the screw-threaded parts of the boxes and bearing against the collars.

In testimony that I claim the foregoing as my invention I affix my signature, in presence of two witnesses, this 5th day of January, A. D. 1899.

ALEXANDER CUNNINGHAM.

Witnesses:
  C. W. HILLS,
  R. CUTHBERT VIVIAN.